UNITED STATES PATENT OFFICE 2,279,885

INTERPOLYMERS OF DI-(ISOBUTYL CARBINOL) ITACONATE AND ETHYL METHACRYLATE

Gaetano F. D'Alelio, Pittsfield, Mass., assignor to General Electric Company, a corporation of New York No Drawing. Application September 12, 1939, Serial No. 294,497

2 Claims. (Cl. 260—78)

This invention relates to the production of new materials having valuable and characteristic properties that make them especially suitable for use in industry, for example in molding, laminating, casting, coating and adhesive applications and for other purposes. The invention is concerned more particularly with compositions of matter comprising an interpolymer of an itaconic ester in which at least one ester group contains an optically inactive amyl radical with at least one other polymerizable compound containing the structure $$-CH=C\diagup$$

more particularly a

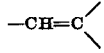 grouping

Specifically the invention is concerned with a composition comprising the product of polymerization of a mixture containing di-(isobutyl carbinol) itaconate and ethyl methacrylate in the ratio of, by weight, 5 parts of the former to 95 parts of the latter.

The new esters used in practicing this invention are itaconic esters in which at least one optically inactive ester group contains five and only five saturated carbons in the alcohol residue. Examples of such esters are mono amyl itaconate,

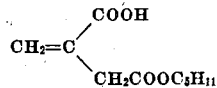

methyl amyl itaconate,

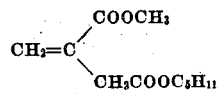

and propyl amyl itaconate,

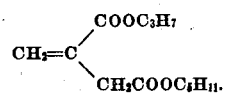

It will be noted that the two last-named esters are mixed esters. The preparation of mixed esters is in general somewhat difficult and complicated, involving extensive processing and high cost. The mono esters are not difficult to make but no particular advantages ordinarily accrue from their use in the production of interpolymers. Hence the preferred embodiment of this invention comprises the preparation, and utilization in the production of interpolymers, of optically inactive amyl esters of itaconic acid in which both ester groups are identical (symmetrical diesters). Examples of such diesters are optically inactive diamyl itaconate, di-(isobutyl carbinol) itaconate, di-(secondary butyl carbinol) itaconate, di-(diethyl carbinol) itaconate and di-(methyl propyl carbinol) itaconate. The mixed amyl itaconates obtained by esterifying itaconic acid with amyl alcohols derived from chlorinated pentanes also may be polymerized alone or with other polymerizable materials in practicing the present invention. The optically inactive mixed and symmetrical itaconic diesters may be graphically expressed by the formula,

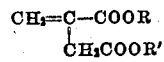

where R and R' are the same or different optically inactive amyl radicals, but preferably are the same.

The prior known methyl, ethyl and optically active amyl itaconic esters are reported as being hard, brittle masses in polymeric state. In contrast therewith, the polymerized esters of this invention are soft or rubbery bodies. For example, normal diamyl itaconate gave a rubbery polymer, diethyl carbinol itaconic ester formed a very viscous polymer, while polymeric methyl propyl carbinol itaconic ester was slightly harder than the diethyl carbinol derivative. Secondary butyl carbinol itaconic ester gave a stiffer polymeric body than di-(diethyl carbinol) itaconate. While these characteristics are valuable in themselves, greater economic utility is derived by their use in interpolymerization processes, as will become evident as the description of the invention proceeds.

In carrying the present invention into effect the amyl itaconates of this invention may be polymerized separately, or mixed with each other, or mixed with other polymerizable material. The homogeneous and heterogeneous polymers of the invention vary from viscous masses to rubbery and hard, solid bodies, depending upon the extent of polymerization and the particular polymerizable or other modifying agent, if any, which is incorporated therewith. Heat, light, or heat and light may be used to effect polymerization, although under such conditions the rate of polymerization is relatively slow. Hence, to accelerate the polymerization, I prefer to use a catalyst, accompanied by heat, light, or heat and light. Examples of catalysts which may be used are oxygen, ozone, hydrogen peroxide, sulfuric acid, aluminum chloride, boron fluoride, super-oxides such as aliphatic acyl peroxides, e. g., acetyl peroxide, stearyl peroxide, etc., peroxides of the aromatic acid series, e. g., benzoyl peroxide. Benzoyl peroxide is the preferred catalyst because of its ease of handling, its relative freedom from explosive hazards and its ready solubility in the monomeric or partially polymerized itaconic ester. The rate of polymerization is a function of the temperature and may be carried out at from room temperature (20°–30° C.) to temperatures materially above 100° C., for example about 130° C.

The optically inactive monomeric diamyl esters when polymerized alone form thermoplastic materials, that is materials the shape of which can be easily changed by heat. The softening point, solubility and other properties of these itaconic esters appear to depend upon the structure of the ester chain. As seen from the examples, no definite rule could be established as with mono-esters such as the esters of methacrylic acid, where the more branched chains produce harder and more brittle masses. For example, isopropyl methacrylate is harder than propyl methacrylate.

In many applications the normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including a liquid hydrocarbon such as mineral oil. This property of high plastic flow can be used to great commercial advantage in molding processes by interpolymerizing these monomers with other bodies of low plastic flow, thereby imparting the desired flow characteristics to the end-product.

In other cases, for example where it is desired to raise the softening point, to decrease the brittleness and the solubility, or to produce insoluble infusible products, this may be done by copolymerizing a selected monomeric or partially polymerized ester of this invention with polymerizable unsaturated materials in monomeric or partially polymerized state, for example an ester of a polybasic acid in which at least two ester groups each contain an unsaturated hydrocarbon radical, more particularly a

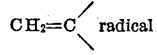 radical such as vinyl, allyl, methallyl, etc. Copolymers of valuable properties also may be obtained by copolymerizing these optically inactive amyl itaconates with other monomeric or partly polymerized itaconic esters, for example dimethyl itaconate, diethyl itaconate, itaconic esters of unsaturated alcohols, for instance diallyl itaconate, etc., vinyl and allyl esters of saturated and unsaturated mono- and poly-carboxylic acids, etc., more particularly polymerizable materials containing a

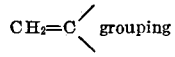 grouping for instance monomeric or partly polymerized styrene, vinyl esters such as the acetate, chloride, bromide, fluoride, etc., vinyl ketones, methvinyl ketones, vinylidene halides as the chloride, bromide and fluoride, acrylic and methacrylic esters, e. g., methyl acrylate, ethyl acrylate, propyl acrylate, butyl acrylate, methyl meth- acrylate, ethyl methacrylate, propyl methacrylate, butyl methacrylate, etc.

As illustrative of the differences in properties resulting from interpolymerizing the itaconic esters of this invention with other polymerizable materials, the following is mentioned:

Diisoamyl itaconate which had been polymerized in the presence of 1% by weight benzoyl peroxide for about 3 days at approximately 70° C. showed considerable plastic flow at that temperature. The same material when copolymerized under the same conditions with only 20% by weight of diallyl itaconate formed a firm, nonflowing gel and set within 3 days to a hard, clear, colorless, heat-resisting copolymer that was insoluble in solvents, such as acetone and benzene, in which diisoamyl itaconate that similarly was polymerized alone was soluble.

As a further illustration of the differences resulting through copolymerization, the following is given.

A solution of 5 parts di-(isoamyl) itaconate and 95 parts ethyl methacrylate was treated with 0.25 part by weight benzoyl peroxide for 42 hours at 55° C. and for 24 hours at 85° C. to give a hard, clear copolymer. This composition was sufficiently ductile so that its flexural strength could not be measured and had an impact strength (Dynstat) of 0.214 foot pound. Ethyl methacrylate, polymerized alone under similar conditions, broke during a flexural strength test at 7450 pounds per square inch and had an impact strength of 0.135 foot pound.

Similar copolymers with extremely high ductility were prepared from the following compositions and had the Dynstat impact strengths shown below.

|  | Foot pounds |
|---|---|
| 5 parts di-(isobutyl carbinol) itaconate<br>95 parts ethyl methacrylate | 0.110 |
| 5 parts di-(amyl) itaconate<br>95 parts ethyl methacrylate | 0.145 |
| 5 parts di-(isobutyl carbinol itaconate)<br>95 parts ethyl methacrylate<br>0.1 part diallyl itaconate | 0.133 |
| 5 parts di-(isoamyl) itaconate<br>95 parts ethyl acrylate<br>0.1 part diallyl itaconate | 0.135 |
| 5 parts di-(amyl) itaconate<br>95 parts ethyl methacrylate<br>0.1 part diallyl itaconate | 0.130 |
| 5 parts di-(diethyl carbonol) itaconate<br>95 parts ethyl methacrylate | 0.142 |
| 5 parts di-(methylpropyl carbinol) itaconate<br>95 parts ethyl methacrylate | 0.155 |

Various methods may be used to prepare the esters with which this invention is concerned. For example, they may be prepared by ester exchange reactions in the presence of a suitable inhibiting agent, such as phenolic bodies, and a suitable catalyst, the reaction proceeding as in an alcoholysis. This, in the preparation of, for instance, optically inactive diamyl itaconate, the reactants may comprise optically inactive amyl alcohol, dimethyl or diethyl itaconate, hydroquinone as an inhibiting agent and a catalyst such as metallic sodium, potassium carbonate, sulfuric acid, etc. The esters of this invention also may be prepared from itaconic nitrile by causing to react therewith a selected optically inactive amyl alcohol in the presence of water and an inorganic acid. Or, they may be made from itaconyl chloride and an optically inactive amyl alcohol, or by decomposition of a corresponding ester of citric or citraconic acids or one of their derivatives.

A preferred method of preparation is by direct esterification of itaconic acid with the selected optically inactive amyl alcohol in the presence of an esterification catalyst, with or without the presence of other unreactive bodies to remove the water resulting from esterification. This method may be carried out continuously.

The mixed esters of this invention, that is itaconic esters in which both ester groups are different, also may be prepared in various ways. These mixed esters may be prepared, for instance, by effecting reaction between itaconic monoester acid chloride and an optically inactive amyl alcohol in the presence or absence of an inhibiting agent such as phenolic bodies, copper, etc. They also may be made by ester exchange reactions in the presence of a suitable catalyst, using an ester of a lower boiling alcohol, such as dimethyl or diethyl itaconate, and an optically inactive amyl alcohol.

Another method of preparation of these mixed esters is from itaconic monoacid chloride and a selected optically inactive amyl alcohol, followed by direct esterification of the other acid radical by another alcohol. These mixed esters also may be made by direct consecutive esterification of each of the carboxyl groups with different alcohols, or by treating itaconic diacid chloride first with one alcohol, then with another. They also may be prepared by saponification of one group of an itaconic diester with alcoholic potassium hydroxide in the cold and either isolating the monoacid from the potassium salt for further reaction with the selected optically inactive amyl alcohol or causing the potassium salt to react directly with an alkyl sulfate corresponding to the ester desired.

In order that those skilled in the art better may understand how the present invention may be carried into effect, the following illustrative examples are given of the preparation of these new esters and of various compositions comprising the same. All parts are by weight.

Diamyl itaconate

A solution of 52.9 parts optically inactive amyl alcohol, 26 parts itaconic acid and 0.53 part concentrated sulfuric acid was refluxed for 17 hours. The reaction solution was added to an equal volume of water and the ester layer which separated was washed with sodium carbonate and distilled water. The crude ester was dried over anhydrous sodium carbonate and distilled under vacuum. Optically inactive diamyl itaconate was obtained as a fraction boiling at 163–170° C. at 17 mm. pressure. The polymeric itaconate was rather rubbery at room temperature.

Mixed amyl esters 130 parts itaconic acid, 243 parts mixed optically inactive amyl alcohols (derived from chlorinated pentanes) and 2.2 parts concentrated sulfuric acid were reacted in a continuous esterification apparatus until no more water was collected. The reaction product was treated as above and 186 parts mixed optically inactive amyl itaconic esters, boiling between 169°–173° C. at 15 mm. pressure, were obtained. The esters were polymerized with 1 and 2% by weight benzoyl peroxide at 70° C.

Similarly prepared from optically inactive alcohols were di-(isobutyl carbinol) itaconate, boiling at 165°–167° C. at 14–15 mm; di-(secondary butyl carbinol) itaconate, boiling at 165°–168° C. at 16–17 mm; di-(diethyl carbinol) itaconate, boiling at 158°–160.5° C. at 18 mm.; and di-(methyl propyl carbinol) itaconate, boiling at 156°–160° C. at 17–18 mm. pressure.

Example 1

This example illustrates interpolymers produced with optically inactive diamyl itaconate.

| | Component | Copolymerization time in hours | Temp., °C. | Percent benzoyl peroxide | Characteristics of copolymer |
|---|---|---|---|---|---|
| (a) | 50 parts di-(amyl) itaconate<br>50 parts dimethyl itaconate | 24 | 70 | 1 | Clear, colorless, slightly soft, tough. |
| (b) | 5 parts di-(amyl) itaconate<br>95 parts ethyl methacrylate | 24<br>Plus 18 | 85<br>55 | 0.25 | Clear, hard, transparent. |
| (c) | 50 parts di-(amyl) itaconate<br>50 parts styrene | 72 | 70 | 0.25 | Soft, translucent. |
| (d) | 50 parts di-(amyl) itaconate<br>50 parts styrene | 72 | 70 | 1.0 | Do. |
| (e) | 50 parts di-(amyl) itaconate<br>50 parts vinyl acetate | 48 | 70 | 1.0 | Clear, colorless, rubbery. |
| (f) | 50 parts di-(amyl) itaconate<br>50 parts methyl methacrylate | 96 | 70 | 1.0 | Clear, colorless, somewhat rubbery, stiff. |
| (g) | 50 parts di-(amyl) itaconate<br>50 parts methacrylic nitrile | 48 | 70 | 1.0 | Soft, rubbery. |
| (h) | 80 parts di-(amyl) itaconate<br>20 parts diallyl itaconate | 1<br>72 | 70<br>70 | 1.0 | Gel, hard, clear. |

Example 2

This example illustrates interpolymers produced with optically inactive di-(isoamyl) itaconate.

| | Component | Copolymerization time in hours | Temp., °C. | Percent benzoyl peroxide | Characteristics of copolymer |
|---|---|---|---|---|---|
| (a) | 50 parts di-(isoamyl) itaconate<br>50 parts diethyl itaconate | 24 | 70 | 1.0 | Hard, clear colorless. |
| (b) | 50 parts di-(isoamyl) itaconate<br>50 parts dimethyl itaconate | 24 | 70 | 1.0 | Do. |
| (c) | 5 parts di-(isoamyl) itaconate<br>95 parts ethyl methacrylate | 42<br>Plus 24 | 55<br>85 | 0.25 | Hard, clear, transparent. |
| (d) | 99 parts di-(isoamyl) itaconate<br>1 part di-(octadecyl) itaconate | 24 | 70 | 1.0 | Clear, colorless, slightly soft. |
| (e) | 50 parts di-(isoamyl) itaconate<br>50 parts diallyl itaconate | 24 | 70 | 1.0 | Hard, clear, colorless. |
| (f) | 50 parts di-(isoamyl) itaconate<br>50 parts glycol dimethacrylate | 24 | 70 | 1.0 | Translucent, hard. |
| (g) | 50 parts di-(isoamyl) itaconate<br>50 parts methallyl methacrylate | 24 | 70 | 1.0 | Translucent, slightly soft. |
| (h) | 20 parts di-(isoamyl) itaconate<br>10 parts diallyl oxalate | 48 | 70 | 1.0 | Soft, clear. |

Example 3

The production of interpolymers with other optically inactive itaconic esters of this invention is illustrated in this example.

| | Component | Copolymerization time in hours | Temp., °C. | Percent benzoyl peroxide | Characteristics of copolymer |
|---|---|---|---|---|---|
| (a) | 5 parts di-(diethyl carbinol) itaconate<br>95 parts ethyl methacrylate | 42<br>Plus 24 | 55<br>85 | 0.25 | Clear, hard. |
| (b) | 5 parts di-(methyl propyl carbinol) itaconate<br>95 parts ethyl methacrylate | 23<br>Plus 24 | 55<br>85 | 0.25 | Transparent, clear, hard. |
| (c) | 5 parts di-(diethyl carbinol) itaconate<br>95 parts methyl methacrylate | 18<br>Plus 24 | 55<br>85 | 0.25 | Hard, translucent. |
| (d) | 5 parts di-(methyl propyl carbinol) itaconate<br>95 parts methyl methacrylate | 18<br>Plus 24 | 55<br>85 | 0.25 | Do. |
| (e) | 20 parts di-(isobutyl carbinol) itaconate<br>20 parts diallyl oxalate | 48 | 70 | 1.0 | Soft, clear. |
| (f) | 5 parts di-(isobutyl carbinol) itaconate<br>95 parts ethyl methacrylate | 42<br>Plus 24 | 55<br>85 | 0.25 | Transparent clear, hard. |

*Example 4*

The following copolymers were obtained from the multi-component systems listed below, in all cases one of the components being an optically inactive itaconic ester of this invention.

| | Component | Copolymerization time in hours | Temp., °C. | Percent benzoyl peroxide | Characteristics of copolymer |
|---|---|---|---|---|---|
| (a) | 50 parts di-(amyl) itaconate<br>25 parts vinyl acetate<br>25 parts methyl methacrylate | 72 | 70 | 1.0 | Translucent, rubbery. |
| (b) | 33⅓ parts di-(isoamyl) itaconate<br>33⅓ parts dimethyl itaconate<br>33⅓ parts diethyl itaconate | 24 | 70 | 1.0 | Soft, clear, colorless. |
| (c) | 49 parts di-(isoamyl) itaconate<br>49 parts dimethyl itaconate<br>2 parts dioctadecyl itaconate | 48 | 70 | 1.0 | Clear, colorless, slightly soft. |
| (d) | 33⅓ parts di-(isoamyl) itaconate<br>33⅓ parts diethyl itaconate<br>33⅓ parts dihexyl itaconate | 48 | 70 | 1.0 | Clear, colorless, soft, rubbery. |
| (e) | 33⅓ parts di-(isoamyl) itaconate<br>33⅓ parts styrene<br>33⅓ parts vinyl acetate | 48 | 70 | 1.0 | Very viscous, clear. |
| (f) | 37½ parts di-(isoamyl) itaconate<br>37½ parts vinyl acetate<br>12½ parts ethyl acrylate<br>12½ parts propyl methacrylate | 48 | 70 | 1.0 | Clear, colorless, rubbery. |
| (g) | 43 parts di-(isoamyl) itaconate<br>43 parts dimethyl itaconate<br>14 parts glycol dimethacrylate | 48 | 70 | 1.0 | Clear, colorless, hard. |
| (h) | 43 parts di-(isoamyl) itaconate<br>43 parts diethyl itaconate<br>14 parts methallyl methacrylate | 48 | 70 | 1.0 | Hard, clear, colorless. |
| (i) | 43 parts di-(isoamyl) itaconate<br>43 parts dimethyl itaconate<br>14 parts methallyl methacrylate | 48 | 70 | 1.0 | Do. |
| (j) | 33⅓ parts di-(isoamyl) itaconate<br>33⅓ parts diallyl itaconate<br>33⅓ parts dimethyl itaconate | 24 | 70 | 1.0 | Do. |
| (k) | 5 parts di-(amyl) itaconate<br>95 parts ethyl methacrylate<br>0.1 part diallyl itaconate | 18<br>Plus 24 | 55<br>85 | 0.25 | Hard, translucent. |
| (l) | 5 parts di-(isoamyl) itaconate<br>95 parts ethyl methacrylate<br>0.1 part diallyl itaconate | 42<br>Plus 24 | 55<br>85 | 0.25 | Transparent, clear, hard. |
| (m) | 5 parts di-(isobutyl carbinol) itaconate<br>95 parts ethyl methacrylate<br>0.1 part diallyl itaconate | 42<br>Plus 24 | 55<br>85 | 0.25 | Do. |
| (n) | 43 parts di-(isoamyl) itaconate<br>43 parts diethyl itaconate<br>14 parts diallyl itaconate | 48 | 70 | 1.0 | Clear, colorless, slightly soft. |
| (o) | 15 parts di-(isoamyl) itaconate<br>15 parts diallyl itaconate<br>15 parts diallyl maleate | 24 | 70 | 1.0 | Hard, clear. |
| (p) | 15 parts di-(isoamyl) itaconate<br>15 parts vinyl acetate<br>5 parts diallyl oxalate | 48 | 70 | 1.0 | Soft. |
| (q) | 15 parts di-(isobutyl carbinol) itaconate<br>10 parts diallyl oxalate<br>5 parts ethyl acrylate | 48 | 70 | 1.0 | Soft, clear. |
| (r) | 15 parts di-(isoamyl) itaconate<br>10 parts diallyl oxalate<br>5 parts ethyl acrylate | 48 | 70 | 1.0 | Soft, rubbery. |

*Example 5*

This example illustrates the production of interpolymers wherein one of the components is a partial polymer. The partial polymers are designated by the symbol P. In all cases at least one of the components is an optically inactive itaconic ester of this invention.

| | Component | Copolymerization time in hours | Temp., °C. | Percent benzoyl peroxide | Characteristics of copolymer |
|---|---|---|---|---|---|
| (a) | 50 parts P di-(isoamyl) itaconate<br>50 parts diallyl itaconate | 72 | 70 | 1.0 | Hard, translucent. |
| (b) | 50 parts P di-(amyl) itaconate<br>50 parts butyl methacrylate | 36 | 70 | 1.0 | Soft, clear. |
| (c) | 50 parts P di-(isoamyl) itaconate<br>50 parts propyl methacrylate | 36 | 70 | 1.0 | Slightly soft, translucent. |
| (d) | 50 parts P di-(isoamyl) itaconate<br>50 parts diethyl itaconate | 48 | 70 | 1.0 | Slightly soft, clear. |
| (e) | 50 parts di-(isoamyl) itaconate<br>50 parts P dimethyl itaconate | 48 | 70 | 1.0 | Translucent, hard. |

| Component | Copolymerization time in hours | Temp., °C. | Percent benzoyl peroxide | Characteristics of copolymer |
|---|---|---|---|---|
| (f) 43 parts P di-(isoamyl) itaconate 43 parts dimethyl itaconate 14 parts P ethyl acrylate | 48 | 70 | 1.0 | Hard, clear. |
| (g) 50 parts P di-(isoamyl) itaconate 50 parts P vinyl acetate | 48 | 70 | 1.0 | Translucent, rubbery. |
| (h) ⅓ parts P di-(isoamyl) itaconate 33⅓ parts P vinyl acetate 33⅓ parts P diethyl itaconate | 48 | 70 | 1.0 | Soft, clear. |
| (i) 50 parts P di-(isoamyl) itaconate 50 parts P methyl methacrylate | 48 | 70 | 1.0 | Translucent, tough. |
| (j) 50 parts P di-(isoamyl) itaconate 50 parts P styrene | 48 | 70 | 1.0 | Translucent, viscous. |
| (k) 50 parts P di-(isoamyl) itaconate 50 parts P ethyl acrylate | 48 | 70 | 1.0 | Clear, rubbery. |
| (l) 50 parts P di-(isoamyl) itaconate 50 parts P methyl acrylate | 48 | 70 | 1.0 | Translucent, soft. |
| (m) 50 parts P di-(isoamyl) itaconate 50 parts P butyl methacrylate | 48 | 70 | 1.0 | Translucent, slightly soft. |
| (n) 50 parts P di-(isoamyl) itaconate 50 parts P isobutyl methacrylate | 48 | 70 | 1.0 | Slightly soft, translucent. |
| (o) 50 parts P di-(isoamyl) itaconate 50 parts P propyl itaconate | 48 | 70 | 1.0 | Slightly translucent, tough. |
| (p) 50 parts P di-(amyl) itaconate 50 parts P methyl methacrylate | 48 | 70 | 1.0 | Translucent, hard. |
| (q) 50 parts P di-(amyl) itaconate 50 parts P ethyl acrylate | 48 | 70 | 1.0 | Soft, clear. |
| (r) 50 parts P di-(amyl) itaconate 50 parts P diethyl itaconate | 48 | 70 | 1.0 | Slightly soft, translucent. |
| (s) 50 parts P di-(amyl) itaconate 50 parts P propyl methacrylate | 36 | 70 | 1.0 | Translucent, soft. |
| (t) 50 parts P di-(isoamyl) itaconate 50 parts P dimethyl itaconate | 48 | 70 | 1.0 | Soft, translucent. |
| (u) 50 parts P di-(isoamyl) itaconate 50 parts P ethyl acrylate | 48 | 70 | 1.0 | Clear, rubbery. |
| (v) 33⅓ parts di-(isoamyl) itaconate 33⅓ parts P methyl methacrylate 33⅓ parts P dimethyl itaconate | 36 | 70 | 1.0 | Hard, translucent. |
| (w) 50 parts di-(isoamyl) itaconate 50 parts P styrene | 48 | 70 | 1.0 | Translucent, viscous. |
| (x) 33⅓ parts di-(isoamyl) itaconate 33⅓ parts P vinyl acetate 33⅓ parts P diethyl itaconate | 48 | 70 | 1.0 | Slightly soft, clear. |
| (y) 50 parts P di-(isoamyl) itaconate 50 parts methallyl methacrylate | 36 | 70 | 1.0 | Hard, opaque. |
| (z) 50 parts P di-(isoamyl) itaconate 50 parts glycol dimethacrylate | 36 | 70 | 1.0 | Do. |
| (aa) 50 parts P di-(amyl) itaconate 50 parts methallyl methacrylate | 36 | 70 | 1.0 | Do. |

The diallyl itaconate, diallyl oxalate, diallyl maleate, glycol dimethacrylate, and methallyl methacrylate in the above examples may be increased or may be replaced in whole or in part by substances such, for instance, as allyl and methallyl esters of polybasic acids, for example, diallyl carbonate, diallyl malonate, diallyl succinate, diallyl glutarate, diallyl adipate, diallyl pimelate, diallyl suberate, diallyl azelaate, diallyl sebacate, diallyl alpha dimethyl malonate, diallyl alpha allyl malonate, diallyl fumarate, diallyl phthalate, diallyl tartrate, triallyl citrate, triallyl carballylate, diallyl citraconate, diallyl mesaconate, diallyl glutaconate, diallyl hydromucate, diallyl glutinate, tetra-allyl symmetrical ethane tetracarboxylate, etc.; by other polyhydric alcohol and unsaturated alcohol esters of acrylic and methacrylic acids, for example glycol acrylate, allyl acrylate, allyl methacrylate, methallyl acrylate, etc.; or by mixtures of such substances.

The optically inactive amyl itaconates of this invention, as well as the interpolymers obtained by copolymerizing these itaconates with other polymerizable bodies have a wide range of properties. Their hardness and solubilities may be varied over a considerable range from fluid compositions of varied intrinsic viscosity or soft, flexible bodies to hard rigid masses that can be swelled or dissolved in many volatile and non-volatile solvents, even those of a hydrocarbon nature. By suitable selection of the starting monomeric or partly polymerized materials, interpolymers can be obtained in an insoluble infusible state practically resistant to the destructive effect of other chemical bodies such as acids, bases, solvents and the like.

When a plasticizing effect is desired in some other synthetic or natural plastic or potentially plastic material, the itaconic esters of this invention are particularly suited for that purpose. High molecular weight bodies, such as polyvinyl chloride, cellulose esters such as the acetate, propionate, butyrate, etc., cellulose ethers such as methyl cellulose, ethyl cellulose, benzyl cellulose, polymerized methyl methacrylate, polystyrene, etc., may be plasticized by incorporating therewith an optically inactive itaconic ester in monomeric, partially polymerized or completely polymerized state, in the presence or absence of a catalyst such as benzoyl peroxide when the monomeric or partially polymerized forms are used. The itaconic ester may be incorporated into the high molecular weight body by simple mechanical agitation or by the use of mutual solvents, followed by the standard mechanical processes known to the plastics art. These bodies then may be subjected to further heat and pressure treatment if desired.

The esters of this invention may be converted to polymers or interpolymers in molds with or without the application of pressure, in the presence or absence of a material which is a solvent for the monomer but not for the polymer, or one which is a solvent for both monomer and polymer, or one which is a solvent for either the monomer or polymer so that spongy or granulated polymeric modifications are obtained.

The solid, thermoplastic polymers and copolymers of this invention, with or without modifying agents, may be used in injection, compression, or transfer molding processes to make numerous articles for industrial, technical and novelty use and other applications.

As modifying agents various fillers may be used, for example wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded, or comminuted form. Pigments, dyes, opacifiers, plasticizing substances, such as dibutyl phthalate, esters of monobasic and polybasic saturated and unsaturated acids, esters of aromatic monobasic and polybasic acids, etc., may be incorporated into the polymers and copolymers of this invention to modify the same. Synthetic and natural resins, gums, oils, waxes, polyhalogenated aromatic derivatives, etc., may likewise be added as modifying agents.

In solvents, or without solvent utilizing a melt process, the fusible polymers may be used in adhesive and laminating applications, to bond paper, cloth, wood, mica flakes, glass sheets, rubber sheets, etc., fibrous materials such as silk, asbestos, glass fibers, synthetic fibers in filament, thread or fabric (woven or felted) form, etc., cellulose derivatives in sheet, comminuted or fiber form, etc. In the form of liquid coating compositions such as varnishes, lacquers, enamels, etc., they find application in surface protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

When the monomers of this invention are copolymerized with, for example, diallyl itaconate in the presence of another non-polymerizable body which acts as a solvent for these monomers, there results a homogeneous gelled material which firmly binds the solvent so as to reduce to a minimum evaporation losses of the solvent. Illustrative of non-polymerizable bodies which thus may be gelled are butyl alcohol, benzene, ethylene dichloride, the monohalogenated aromatic hydrocarbons or mixtures of halogenated aromatic hydrocarbons, ethylene glycol, mineral oils including lubricating oils, etc.

What I claim as new and desire to secure by Letters Patent of the United States is:

1. A composition comprising the product of polymerization of a mixture containing di-(isobutyl carbinol) itaconate and ethyl methacrylate in the ratio of, by weight, 5 parts of the former to 95 parts of the latter.

2. The method of producing a clear, hard, organic plastic material which comprises forming a mixture containing monomeric di-(isobutyl carbinol) itaconate and monomeric ethyl methacrylate in the ratio of, by weight, 5 parts of the former to 95 parts of the latter and, in addition to said monomers, a small amount of benzoyl peroxide as a polymerization catalyst, and heating the said mixture to obtain a clear, hard interpolymerization product.

GAETANO F. D'ALELIO.

CERTIFICATE OF CORRECTION.

Patent No. 2,279,885. April 14, 1942.

GAETANO F. D'ALELIO.

It is hereby certified that error appears in the printed specification of the above numbered patent requiring correction as follows: Page 5, first column, line 13, in the table, Example 5, for "1/3 parts" read --33 1/3 parts--; and that the said Letters Patent should be read with this correction therein that the same may conform to the record of the case in the Patent Office.

Signed and sealed this 16th day of June, A. D. 1942.

(Seal)

Henry Van Arsdale,
Acting Commissioner of Patents.